United States Patent
Lahiri

(10) Patent No.: US 10,135,702 B2
(45) Date of Patent: Nov. 20, 2018

(54) METHODS, SYSTEMS, AND COMPUTER READABLE MEDIA FOR TESTING NETWORK FUNCTION VIRTUALIZATION (NFV)

(71) Applicant: Ixia, Calabassas, CA (US)

(72) Inventor: Abhijit Lahiri, Kolkata (IN)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 175 days.

(21) Appl. No.: 14/939,674

(22) Filed: Nov. 12, 2015

(65) Prior Publication Data

US 2017/0141974 A1 May 18, 2017

(51) Int. Cl.
*H04L 12/26* (2006.01)

(52) U.S. Cl.
CPC ............ *H04L 43/028* (2013.01); *H04L 43/12* (2013.01)

(58) Field of Classification Search
CPC ..... H04L 67/10; H04L 41/12; H04L 12/4641; H04L 45/02; G06F 2009/45595; G06F 11/0712; G06F 15/16
USPC .................................. 709/224, 226; 370/311
See application file for complete search history.

(56) References Cited

U.S. PATENT DOCUMENTS

| | | | |
|---|---|---|---|
| 6,917,595 B2 | 7/2005 | Chang et al. | |
| 7,526,691 B1 | 4/2009 | Jayabharathi et al. | |
| 7,899,048 B1 | 3/2011 | Walker et al. | |
| 9,647,909 B2 | 5/2017 | Kuan et al. | |
| 9,674,639 B2 * | 6/2017 | Qiu | H04W 4/003 |
| 9,680,728 B2 | 6/2017 | Besser | |
| 9,705,849 B2 | 7/2017 | Sood et al. | |
| 9,967,165 B2 | 5/2018 | Arora et al. | |
| 2006/0072543 A1 | 4/2006 | Lloyd et al. | |
| 2006/0129847 A1 * | 6/2006 | Pitsos | H04L 9/3236 713/193 |
| 2007/0038744 A1 | 2/2007 | Cocks et al. | |
| 2007/0195776 A1 | 8/2007 | Zheng et al. | |
| 2007/0280243 A1 | 12/2007 | Wray et al. | |
| 2008/0044018 A1 | 2/2008 | Scrimsher et al. | |

(Continued)

FOREIGN PATENT DOCUMENTS

WO WO 2014/030061 A2 2/2014

OTHER PUBLICATIONS

Non-Final Office Action for U.S. Appl. No. 14/960,865 (dated Apr. 21, 2017).

(Continued)

*Primary Examiner* — Tesfay Yohannes

(57) ABSTRACT

Methods, systems, and computer readable media for testing network function virtualization (NFV) are disclosed. According to one method, the method occurs at a network test controller implemented using at least one processor. The method includes determining, using network configuration information, a first insertion point for inserting a first network function tester (NFT) into a service chain comprising a plurality of virtualized network functions (VNFs). The method also includes configuring the first NFT to analyze or ignore traffic matching filtering information, wherein the traffic traverses the first NFT from at least one VNF of the plurality of VNFs. The method further includes inserting, at the first insertion point, the first NFT into the service chain.

17 Claims, 4 Drawing Sheets

(56) References Cited

U.S. PATENT DOCUMENTS

| | | | |
|---|---|---|---|
| 2009/0287837 A1* | 11/2009 | Felsher | G06F 19/328 709/229 |
| 2010/0138920 A1 | 6/2010 | Kim et al. | |
| 2010/0199275 A1 | 8/2010 | Mudigonda et al. | |
| 2010/0238923 A1 | 9/2010 | Cheon et al. | |
| 2010/0317420 A1* | 12/2010 | Hoffberg | G06Q 30/0207 463/1 |
| 2011/0116719 A1* | 5/2011 | Bilobrov | G06K 9/00711 382/217 |
| 2011/0125892 A1* | 5/2011 | Rajan | H04L 43/10 709/224 |
| 2012/0106423 A1* | 5/2012 | Nylander | H04W 52/0241 370/311 |
| 2012/0290703 A1 | 11/2012 | Barabash et al. | |
| 2012/0317566 A1 | 12/2012 | Santos et al. | |
| 2013/0159021 A1* | 6/2013 | Felsher | G06F 19/328 705/3 |
| 2013/0288668 A1* | 10/2013 | Pragada | H04W 12/06 455/426.1 |
| 2014/0229605 A1 | 8/2014 | Besser | |
| 2014/0229781 A1 | 8/2014 | Whetsel | |
| 2014/0229945 A1* | 8/2014 | Barkai | H04L 49/70 718/1 |
| 2014/0269709 A1 | 9/2014 | Benny et al. | |
| 2014/0317293 A1* | 10/2014 | Shatzkamer | G06F 9/455 709/226 |
| 2014/0317600 A1 | 10/2014 | Klunder et al. | |
| 2015/0029848 A1 | 1/2015 | Jain | |
| 2015/0063166 A1 | 3/2015 | Sif et al. | |
| 2015/0234725 A1 | 8/2015 | Cillis et al. | |
| 2015/0236936 A1 | 8/2015 | Waldbusser | |
| 2015/0332357 A1* | 11/2015 | McBride | G06Q 30/0601 705/26.1 |
| 2015/0333979 A1* | 11/2015 | Schwengler | H04L 41/5054 709/226 |
| 2016/0062781 A1 | 3/2016 | Tsirkin et al. | |
| 2016/0110211 A1 | 4/2016 | Karnes | |
| 2016/0147987 A1* | 5/2016 | Jang | G06F 21/32 726/19 |
| 2016/0191545 A1 | 6/2016 | Nanda et al. | |
| 2016/0232019 A1 | 8/2016 | Shah et al. | |
| 2016/0248858 A1* | 8/2016 | Qiu | H04W 4/003 |
| 2016/0323243 A1* | 11/2016 | LeVasseur | G06N 99/005 |
| 2016/0352578 A1* | 12/2016 | Chen | H04L 41/12 |
| 2017/0026806 A1* | 1/2017 | Jampani | H04B 17/318 |
| 2017/0048110 A1* | 2/2017 | Wu | H04L 41/12 |
| 2017/0085459 A1 | 3/2017 | Xia et al. | |
| 2017/0094002 A1* | 3/2017 | Kumar | H04L 49/70 |
| 2017/0099195 A1 | 4/2017 | Raney | |
| 2017/0099197 A1 | 4/2017 | Raney | |
| 2017/0118102 A1 | 4/2017 | Majumder et al. | |
| 2017/0163510 A1 | 6/2017 | Arora et al. | |
| 2017/0214694 A1* | 7/2017 | Yan | H04L 63/101 |

OTHER PUBLICATIONS

Commonly-assigned, co-pending U.S. Appl. No. 14/960,865, for "Methods, Systems, and Computer Readable Media for Packet Monitoring in a Virtual Environment," (Unpublished, filed Dec. 7, 2015).

"Network function virtualization," https://en.wikipedia.org/wiki/Network_function_virtualization, pp. 1-7 (Nov. 23, 2015).

"Software-defined networking," https://en.wikipedia.org/wiki/Software-defined_networking, pp. 1-9 (Nov. 13, 2015).

"Ixia Phantom vTap™ with TapFlow™ Filtering," Ixia Data Sheet, Document No. 915-6805-01 Rev K, pp. 1-4 (Jul. 2015).

Final Office Action for U.S. Appl. No. 31/765,628 (dated Jul. 27, 2016).

"Virtual Taps," Net Optics: Architecting Visibility Into Your Network, p. 1-5 (accessed Jun. 30, 2016).

Non-Final Office Action for U.S. Appl. No. 13/765,628 (dated Dec. 1, 2014).

Notice of Allowance and Fee(s) Due & Examiner-Initiated Interview Summary for U.S. Appl. No. 13/765,628 (dated Jan. 10, 2017).

Notification of Transmittal of the International Search Report and the Written Opinion of the International Searching Authority, or the Declaration for International Application No. PCT/US2016/05163 (dated Jan. 5, 2017).

Advisory Action and Examiner Initiated Interview Summary for U.S. Appl. No. 13/765,628 (dated Oct. 17, 2016).

Notice of Allowance and Fee(s) Due for U.S. Appl. No. 14/490,865 (dated Jan. 2, 2018).

Corrected Notice of Allowability for U.S. Appl. No. 14/960,865 (dated Feb. 7, 2018).

Notice of Allowance and Fee(s) Due for U.S. Appl. No. 14/960,865 (dated Jan. 2, 2018).

Commonly-assigned, co-pending U.S. Appl. No. 16/039,283 for "Methods, Systems, and Computer Readable Media for Testing Virtualized Network Functions and Related Infrastructure," (Unpublished, filed Jul. 18, 2018).

* cited by examiner

METHODS, SYSTEMS, AND COMPUTER READABLE MEDIA FOR TESTING NETWORK FUNCTION VIRTUALIZATION (NFV)

TECHNICAL FIELD

The subject matter described herein relates to network virtualization. More specifically, the subject matter relates to methods, systems, and computer readable media for testing network function virtualization (NFV).

BACKGROUND

Using network function virtualization (NFV) and software defined networking (SDN), deployments utilizing service chain architecture are becoming more common. For example, a service chain deployment may involve a number of virtualized network functions connected or chained together to perform one or more services. In this example, each virtualized network function may include one or more virtual machines (VMs), virtualization containers, and/or other software implemented using various hardware. While SDN and NFV may reduce the need for specialized hardware for network functions or related service, issues can arise when deploying virtualized network functions across complex network topologies. For example, testing, troubleshooting, and isolating faults can be more difficult in environments that use NFV.

Accordingly, a need exists for methods, systems, and computer readable media for testing NFV.

SUMMARY

Methods, systems, and computer readable media for testing network function virtualization (NFV) are disclosed. According to one method, the method occurs at a network test controller implemented using at least one processor. The method includes determining, using network configuration information, a first insertion point for inserting a first network function tester (NFT) into a service chain comprising a plurality of virtualized network functions (VNFs). The method also includes configuring the first NFT to analyze or ignore traffic matching filtering information, wherein the traffic traverses the first NFT from at least one VNF of the plurality of VNFs. The method further includes inserting, at the first insertion point, the first NFT into the service chain.

According to one system, the system includes a network test controller implemented using at least one processor. The network test controller is configured to determine, using network configuration information, a first insertion point for inserting a first network function tester (NFT) into a service chain comprising a plurality of virtualized network functions (VNFs), to configure the first NFT to analyze or ignore traffic matching filtering information, wherein the traffic traverses the first NFT from at least one VNF of the plurality of VNFs, and to insert, at the first insertion point, the first NFT into the service chain.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

Figure 1:
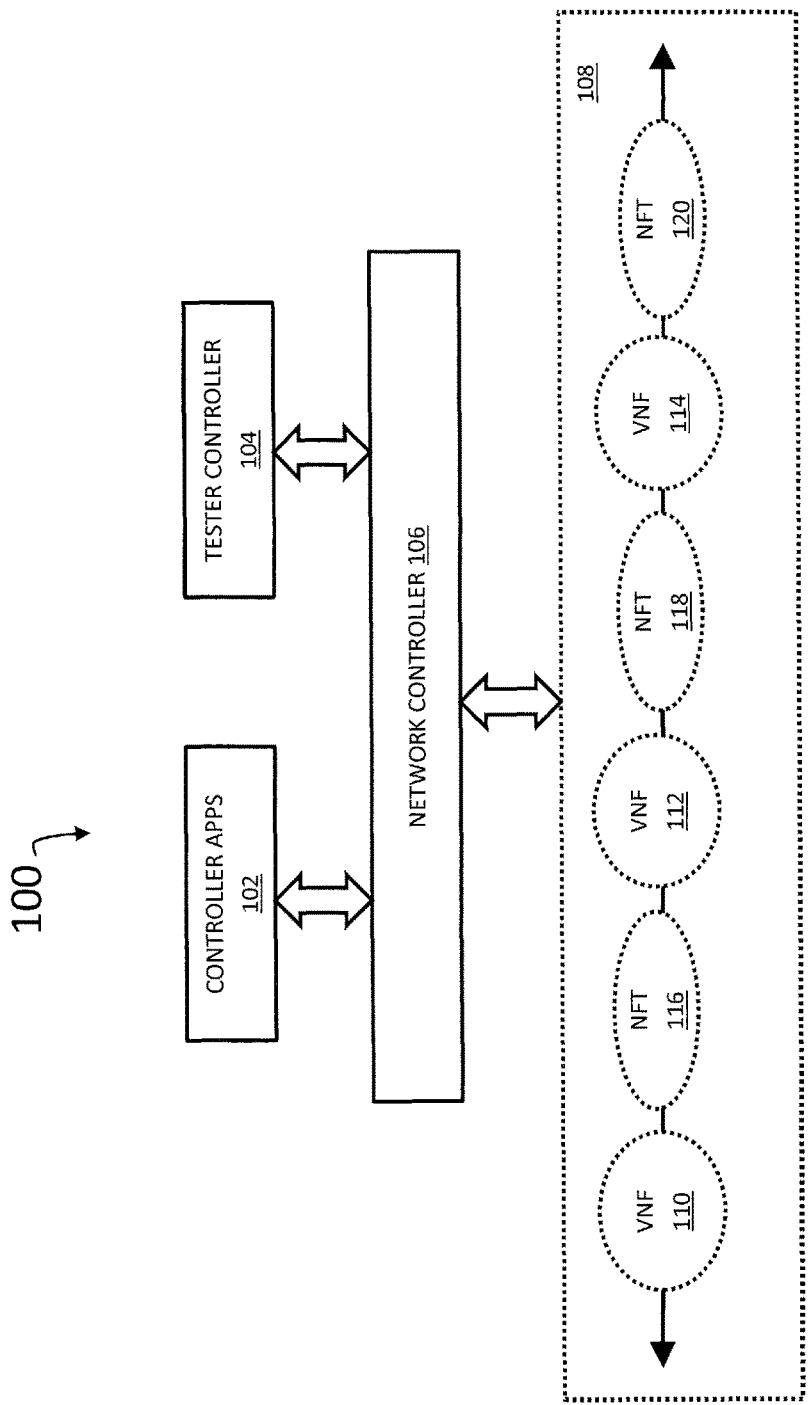
FIG. 1 is a diagram illustrating an environment for testing network function virtualization (NFV) according to an embodiment of the subject matter described herein.

FIG. 1 is a diagram illustrating a computing environment 100 for testing network function virtualization (NFV) according to an embodiment of the subject matter described herein. Computing environment 100 may include one or more networks and/or one or more computer platforms, nodes, or devices. Referring to FIG. 1, computing environment 100 may include one or more controller applications 102, a tester controller 104, and/or a network controller 106.

Controller applications 102 may represent any suitable entity or entities (e.g., software executing on a hardware processor) for providing various instructions, configurations, and/or other information to network controller 106. For example, controller applications 102 may include a network orchestrator for managing policies and service levels across network resources (e.g., servers, data storage, and/or switches) using automated workflows, provisioning, and other resource management techniques. In this example, the network orchestrator may instruct network controller 106, such as a software defined networking (SDN) controller, for deploying virtualized network functions (VNFs), which can be combined, connected, or utilized together in service chain 108 to perform one or more services, such as voice over Internet protocol (VoIP) communications or video-on-demand streaming.

Tester controller 104 may represent any suitable entity or entities (e.g., a testing platform, a test tool, a device, a node, and/or software executing on one or more computer platforms) for initiating deployment of network function testers (NFTs) 118-120. For example, tester controller 104 may analyze end-to-end communications and/or related information associated with service chain 108 and may determine that deploying NFTs 118-120 may be beneficial for testing one or more VNFs in service chain 108. In this example, tester controller 104 may generate configuration information for configuring NFTs 118-120 and may request that network controller 106 insert NFTs 118-120 into service chain 108 using the configuration information.

Network controller 106 may represent any suitable entity or entities (e.g., a testing platform, a test tool, a device, a node, and/or one or more computer platforms) for creating, configuring, managing, and/or deploying service chain 108, VNFs 110-114, and/or NFTs 116-120. For example, network controller 106 may include an SDN controller capable of configuring network devices and/or service chain 108 via an SDN related interface. In another example, network controller may configure or provision service chain 108 by configuring and inserting VNFs 110-114 and NFTs 116-120 into service chain 108.

In some embodiments, tester controller 104 and/or network controller 106 may be configured to perform one or more aspects associated with testing one or more devices, networks, or services. In some embodiments, tester controller 104 and/or network controller 106 may be co-located or integrated into a network test controller. In such embodiments, the network test controller may be a single node or may be distributed across multiple computer platforms or nodes.

In some embodiments, tester controller 104, network controller 106, or a network test controller (e.g., a device or entity that includes at least some functionality of tester controller 104 and network controller 106) may be configured for fully automated or semi-automated testing of a network or service chain 108. For example, a network test controller may receive and analyze a network configuration of a service chain 108 and may auto-configure NFTs 116-120 for testing service chain 108 as needed. In this example, the network test controller may monitor traffic traversing service chain 108 by inserting a set of NFTs at each "end" of service chain 108. Continuing with this example, if faults or issues are detected, the network test controller may determine insertion points into service chain 108 for one or more NFTs and may dynamically insert, using the insertion points, the NFTs to detect points of failure and generate automated alerts to administrators. In some examples, some parts of the testing may also be based user-provided preferences, historical information, or preconfigured information.

In some embodiments, tester controller 104, network controller 106, or a network test controller may configure a network under test and may then validate the network or a portion thereof, such as individual network elements or VNFs. In such embodiments, this configuration may, optionally, be performed using an SDN controller or a proprietary controller which has one or more application programming interface (APIs) exposed and is supported by the network test controller.

In some embodiments, tester controller 104 or a network test controller may receive information about a pre-existing network configuration (e.g., from network controller 106) and may configure NFTs 116-120 for validating the network configuration. In some embodiments, tester controller 104 or a network test controller may modify some aspects of a configuration for various test and measurement purposes. In such embodiments, tester controller 104 or a network test controller may change the modified configuration back to its original configuration.

In some embodiments, determining or selecting insertion points into service chain 108 for one or more NFTs may involve analyzing various network configuration information and/or network traffic issues. For example, tester controller 104, network controller 106, or a network test controller may monitor traffic that traverses service chain 108. In this example, if traffic issues are detected, the controller may use historical information, network topology information, user preferences, expected output, and/or analysis of the traffic issues to select one or more insertion points, where each insertion point may be for testing one or more VNFs likely causing or contributing to the traffic issues. In another example, tester controller 104, network controller 106, or a network test controller may determine insertion points such that every VNF in service chain 108 is connected to at least one NFT (e.g., via an egress port and/or an ingress port).

Service chain 108 may represent a logical grouping of VNFs 110-114 and/or other entities for performing one or more services. For example, service chain 108 may include VNFs 110-114 for converting VoIP packets from one format to another format, where each VNF in service chain 108 performs one or more functions associated with converting the VoIP packets. In another example, service chain 108 may include VNFs 110-114 for providing media communications between two networks. In this example, VNF 110 may perform a firewall function, VNF 112 may perform a user authentication function, and VNF 114 may perform a media server function.

Each of VNFs 110-114 may represent any suitable entity (e.g., software stored in a memory and/or executing using at least one processor) for performing one or more network functions. Each of VNFs 110-114 may be a logical construct implemented using hardware or physical resources from one or more locations, devices, and/or platforms. For example, using at least one processor from a first computer platform or server rack and memory from a second computer platform or server rack, VNF 110 may perform web server functions, e.g., receiving hypertext transfer protocol (HTTP) requests and providing HTTP responses. In another example, using processors and memory from a same computer platform or server rack, VNF 112 and VNF 114 may perform encryption functions and decryption functions, respectively.

Each of NFTs 116-120 may represent any suitable entity (e.g., software stored in a memory and/or executed using at least one processor) for testing one or more VNFs. Each of NFTs 116-120 may be a logical construct implemented using hardware or physical resources from one or more locations, devices, and/or platforms. For example, NFT 116 may be implemented on a same computer platform as NFT 120 and VNF 110. In another example, NFT 116 may be implemented on different computer platforms from NFT 120 and VNF 110.

In some embodiments, NFTs 116-120 may test various VNFs or related functionality, e.g., a load balancing function, an intrusion detection function, an intrusion protection function, an antivirus function, a firewall function, an anti-spam function, a switching function, or a routing function. In some embodiments, NFTs 116-120 may act or appear to other entities like NFTs, VNFs, networks, or hosts. In some embodiments, testing by NFTs 116-120 may be transparent or unknown by other entities (e.g., VNF 110-114) in service chain 108.

In some embodiments, NFTs 116-120 may be configured to bypass (e.g., ignore) or analyze traffic depending on traffic filters or related configurations. For example, NFT 116 may be configured and deployed into service chain 108 with the capability to bypass traffic depending on filtering information. In some embodiments, NFTs 116-120 may be configured to allow a 100% bypass, e.g., all traffic is passed through from a receive port to a transmit port without testing or analysis. In some embodiments, NFTs 116-120 may be configured to allow a partial bypass depending on filter configuration, e.g., a portion of traffic matching certain characteristics may be passed through from a receive port to a transmit port without testing or analysis.

Examples of filtering information may include payload characteristics, header parameters, IP addresses, origination identifiers, destination identifiers, and/or other traffic related information. In some embodiments, filtering information may be determined based on testing requirements, functionality being tested, and/or other factors. For example, NFT 118 may be configured with a filter for testing VNF 114 performing an intrusion detection function. In this example, a user or tester controller 104 may configure NFT 118 to allow all traffic to bypass testing except for traffic from a source-destination pair. Continuing with this example, NFT 118 may use the traffic from the source-destination pair for testing intrusion detection at VNF 114.

In some embodiments, NFTs 116-120 may be configured to generate and/or send test traffic for testing one or more VNFs. In some embodiments, traffic generation information may be determined based on testing requirements, a VNF's functionality, and/or other factors. For example, NFT 116 may be configured to act as a traffic generator for testing VNF 110 performing a firewall function. In this example, a user or tester controller 104 may configure NFT 116 to generate traffic that appears to originate from different networks, including local and remote networks. Continuing with this example, NFT 116 may send the generated traffic to VNF 110, where a subsequent NFT 120 may analyze output from VNF 110 for testing VNF 110. In another example, NFT 116 may be configured to act as a traffic capturer and re-player for testing VNF 112. In this example, a user or tester controller 104 may configure NFT 116 to capture traffic that matches particular characteristics. Continuing with this example, NFT 116 may send the captured traffic to VNF 112, where a subsequent NFT 118 may analyze output from VNF 112 for testing VNF 112

In some embodiments, NFTs 116-120 may be configured for dynamic pluggability (e.g., insertion, activation, or de-activation) within service chain 108. For example, NFT 116 may represent a virtual image or container which can be dynamically inserted in a virtual environment using any virtual infrastructure technology, such as a hypervisor enabled or a container enabled infrastructure. In another example, NFTs 116-120 may be configured for dynamic enablement or disablement within service chain 108 based on various factors, such as testing requirements, detected traffic issues, network conditions, or time of day.

In some embodiments, NFTs 116-120 may be deployed for obtaining end to end visibility of service chain 108 and/or for validating end to end functionality and/or individual VNFs. For example, NFT 116 may be located at a start of service chain 108 and NFT 120 may be located at an end of service chain 108, where VNF 110-114 may located in between NFT 116 and NFT 120. In this example, NFT 116 may send test traffic via an egress port to a first VNF and then, after processing, the first VNF sends output to a subsequent VNFN and so on and so forth until a last VNF in service chain 108 sends output to NFT 120, where NFT 120 may analyze the output for errors or other potential issues based on expected output for the test traffic.

In some embodiments, NFTs 116-120 may be configured and inserted into service chain 108 for configuration validation of VNFs. For example, configuration validation may include deploying NFTs 116-120 at various points in service chain 108 for sending various types of test traffic to VNFs 110-114. In this example, the test traffic may be useful for validating each VNF and/or configuration units. In some embodiments, NFTs 116-120 may analyze traffic and related behavior at the ends of a network (e.g., service chain 108), may rate various tested features (e.g., pass/fail or on a 1-5 scale), and may provide the ratings and other information to one or more entities or network operators.

In some embodiments, NFTs 116-120 may be configured and inserted into service chain 108 for performing troubleshooting and/or to detect points of failure. In some embodiments, two NFTs can be enabled to test a specific VNF and its related functionality by leveraging a divide-and-rule troubleshooting technique. In this example, the divide-and-rule troubleshooting technique may involve validating individual VNFs in service chain 108 by deploying NFTs 116-120 between each VNF, where each NFT may validate and/or troubleshoot a VNF in service chain 108 by analyzing output from the VNF. For example, if firewall rules are not working and a firewall VNF is located between NFT 116 and NFT 118, NFTs 116 and 118 may send captured or self-generated traffic to test firewall VNF and analyze results. In another example, any type of network function or VNF may be tested by leveraging test capabilities supported by NFTs 116-120.

In some embodiments, NFTs 116-120 may be configured for various operation modes. For example, NFTs 116-120 may be deployed into service chain 108 in a full bypass mode. In this example, the full bypass mode allows all traffic to bypass NFTs 116-120 without disrupting or interrupting traffic traversing service chain 108. In another example, NFTs 116-120 may be deployed into service chain 108 in a partial bypass mode, where some traffic is validated (e.g., analyzed or tested) based on a traffic filter and other traffic (e.g., traffic not matching the traffic filter) is allowed to traverse without being validated. In another example, NFTs 116-120 may be deployed into service chain 108 in a test mode. In a test mode, NFTs 116-120 may be dynamically plugged in or dynamically enabled depending on test requirements and/or factors. In some embodiments, a test mode may also indicate one or more test and/or measurement procedures to perform on relevant traffic.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of tester controller 104 and network controller 106.

Figure 2:
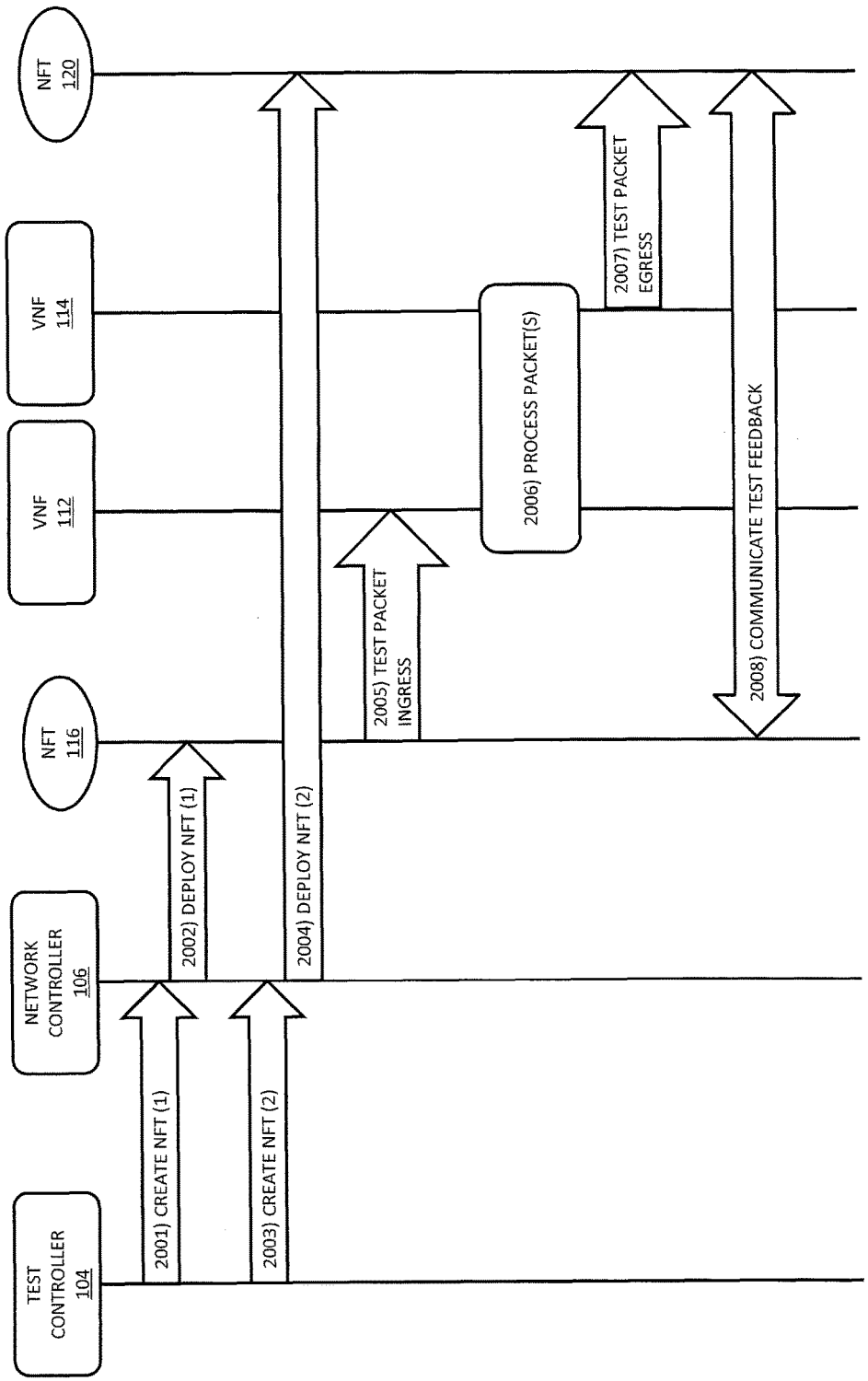
FIG. 2 is a diagram illustrating communications associated with testing NFV according to an embodiment of the subject matter described herein.

FIG. 2 is a diagram illustrating communications associated with testing NFV according to an embodiment of the subject matter described herein. In some embodiments, network controller 106 or another entity (e.g., tester control 104 or a network test controller) may interact with computing environment 100 for configuring, provisioning, or managing one or more service chains or related VNFs. For example, network controller 106 may receive requests for inserting NFTs into service chain 108 from tester controller 104 or another entity. In this example, tester controller 104 may provide configuration information, such as filtering information, when requesting that an NFT be inserted into service chain 108. In another example, network controller 106 or a network test controller may make its own determination as to configuring and inserting NFTs 116-120 into service chain 108.

In some embodiments, prior to requesting that an NFT be inserted into service chain 108, tester controller 104 or another entity may analyze network related information and/or other information (e.g., detected traffic issues associated with service chain 108) to select or determine insertion points for one or more NFTs in service chain 108.

In some embodiments, tester controller 104 or another entity may determine configuration information for each NFT to be deployed or inserted in service chain 108. Some examples of configuration information may include traffic generation information indicating traffic to generate and/or send when testing a VNF, filtering information indicating traffic types that are to be inspected, analyzed, or ignored, active information indicating when NFT 116 is to be active, and/or an insertion point or other information indicating a location or position in service chain 108.

Referring to FIG. 2, in step 2001, a request for creating and/or configuring NFT 116 for insertion into service chain 108 may be sent from test controller 104 to network controller 106. The create request may include an insertion point for NFT 116 and/or various configuration information for configuring NFT 116.

In step 2002, NFT 116 may be deployed or inserted into service chain 108. For example, network controller 106 may deploy NFT 116 based on a request from test controller 104.

In step 2003, a request for creating and/or configuring NFT 120 for insertion into service chain 108 may be sent from test controller 104 to network controller 106. The create request may include an insertion point for NFT 120 and/or various configuration information for configuring NFT 120.

In step 2004, NFT 120 may be deployed or inserted into service chain 108. For example, network controller 106 may deploy NFT 120 based on a request from test controller 104.

In step 2005, test packets may be sent from NFT 116 to VNF 112. For example, NFT 116 may be configured to generate and send multiple Internet protocol (IP) packets with particular headers and payloads for testing VNF 112. In another example, NFT 116 may send captured data packets that match a particular filter. In this example, the data packets may be based on packets captured or received from an originating entity.

In step 2006, test packets may be processed by VNF 112 and VNF 114. For example, VNF 112 may receive traffic via NFT 116, process the traffic by performing one or more functions, and then provide the traffic to VNF 114 for further processing.

In step 2007, test packets may be sent from VNF 114 to NFT 120. For example, NFT 120 may be configured to analyze egress traffic from VNF 114. In this example, NFT 120 may determine whether VNF 114 provided expected traffic or may detect whether the received traffic has issues.

In step 2008, test related feedback may be communicated between NFT 116 and NFT 120. For example, NFT 116 may provide expected output for some test traffic to be processed by VNF 112 and VNF 114 and NFT 120 may provide analytics or results based on the expected output and the actual output received from VNF 114.

In some embodiments, if issues are detected at NFT 120 but results are inconclusive as to which VNF is causing the issues, network controller and/or tester controller 104 may initiate inserting NFT 118 between VNF 112 and VNF 114, thereby each NFT can monitor or detect issues caused by a particular VNF.

It will be appreciated that the communications and/or actions depicted in FIG. 2 are for illustrative purposes and that different and/or additional communications and/or actions than those depicted in FIG. 2 may be used for testing VNFs and/or other aspects of NFV. It will also be appreciated that various communications and/or actions described herein may occur concurrently or in a different order or sequence.

Figure 3:
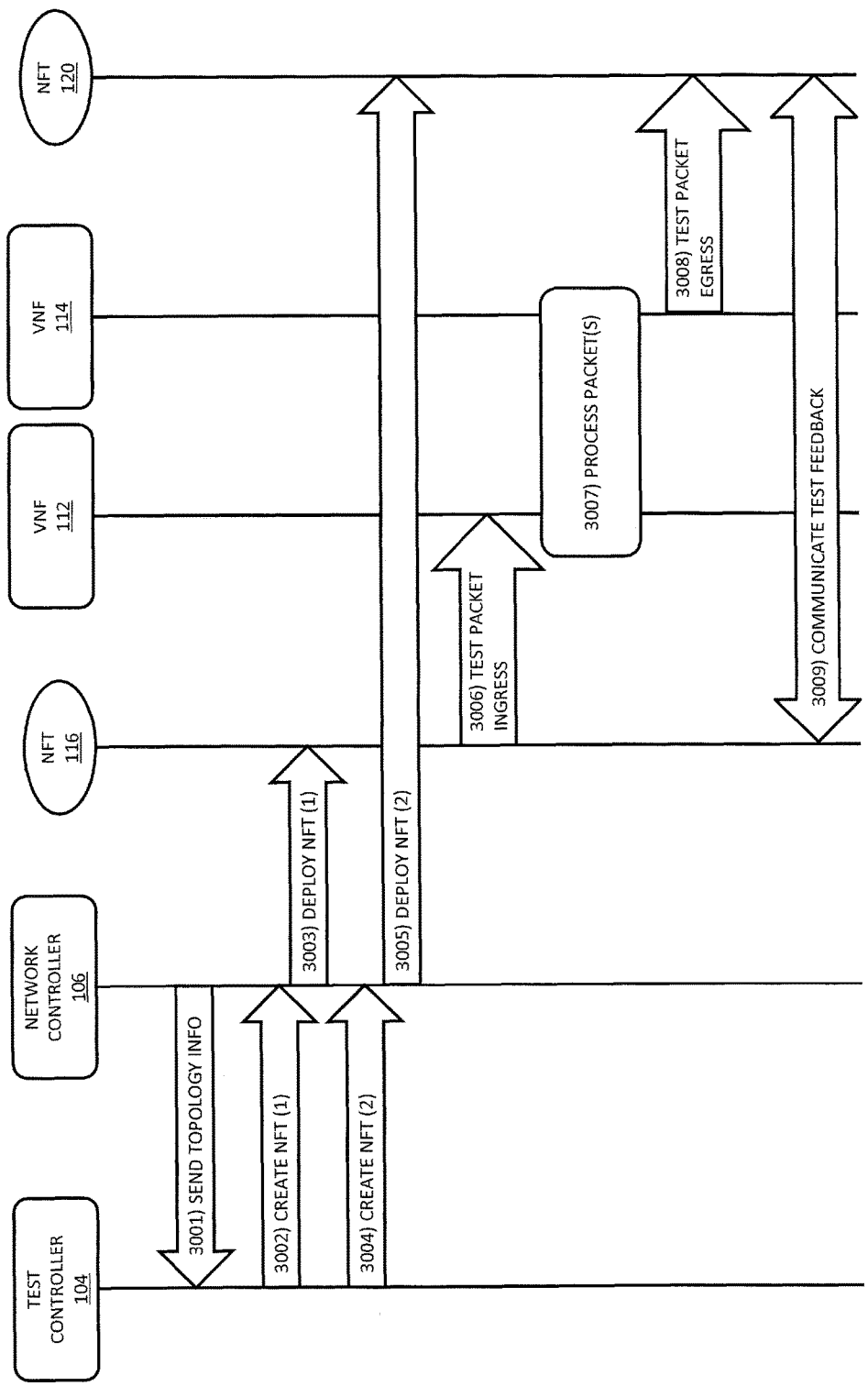
FIG. 3 is a diagram illustrating communications associated with testing NFV according to another embodiment of the subject matter described herein.

FIG. 3 is a diagram illustrating communications associated with testing NFV according to another embodiment of the subject matter described herein. In some embodiments, network controller 106 or another entity (e.g., tester control 104 or a network test controller) may interact with computing environment 100 for configuring, provisioning, or managing service chain 108 or related VNFs. For example, network controller 106 may send network topology information or other information to tester controller 104. In this example, tester controller 104 may use this network information when requesting that an NFT be inserted into service chain 108. In another example, network controller 106 or a network test controller may make its own determination using network related information for configuring and inserting NFTs 116-120 into service chain 108.

Referring to FIG. 3, in step 3001, network related information may be sent from network controller 106 to tester controller 104. Some examples of network related information may include network topology information and/or service chain related information, such as the order of VNFs connected in service chain 108 and ports used for egress and ingress of each VNF in service chain.

In some embodiments, prior to requesting that an NFT be inserted into service chain 108, tester controller 104 or another entity may analyze network related information and/or other information (e.g., detected traffic issues associated with service chain 108) to select or determine insertion points for one or more NFTs in service chain 108.

In some embodiments, tester controller 104 or another entity may determine configuration information for each NFT to be deployed or inserted in service chain 108. For example, configuration information may include an activation or operation mode, traffic generation related information, and/or one or more traffic filters.

In step 3002, a request for creating and/or configuring NFT 116 for insertion into service chain 108 may be sent from test controller 104 to network controller 106. The create request may include an insertion point for NFT 120 and/or various configuration information for configuring NFT 116.

In step 3003, NFT 116 may be deployed or inserted into service chain 108. For example, network controller 106 may deploy NFT 116 based on a request from test controller 104.

In step 3004, a request for creating and/or configuring NFT 120 for insertion into service chain 108 may be sent from test controller 104 to network controller 106. The create request may include an insertion point for NFT 120 and/or various configuration information for configuring NFT 120.

In step 3005, NFT 120 may be deployed or inserted into service chain 108. For example, network controller 106 may deploy NFT 120 based on a request from test controller 104.

In step 3006, test packets may be sent from NFT 116 to VNF 112. For example, NFT 116 may be configured to generate and send multiple Internet protocol (IP) packets with particular headers and payloads for testing VNF 112. In another example, NFT 116 may send captured data packets that match a particular filter. In this example, the data packets may be based on packets captured or received from an originating entity.

In step 3007, test packets may be processed by VNF 112 and VNF 114. For example, VNF 112 may receive traffic via NFT 116, process the traffic by performing one or more functions, and then provide the traffic to VNF 114 for further processing.

In step 3008, test packets may be sent from VNF 114 to NFT 120. For example, NFT 120 may be configured to analyze egress traffic from VNF 114. In this example, NFT 120 may determine whether VNF 114 provided expected traffic or may detect whether the received traffic has issues.

In step 3009, test related feedback may be communicated between NFT 116 and NFT 120. For example, NFT 116 may provide expected output for some test traffic to be processed by VNF 112 and VNF 114 and NFT 120 may provide analytics or results based on the expected output and the actual output received from VNF 114.

In some embodiments, if issues are detected at NFT 120 but results are inconclusive as to which VNF is causing the issues, network controller and/or tester controller 104 may initiate inserting NFT 118 between VNF 112 and VNF 114, thereby each NFT can monitor or detect issues caused by a particular VNF.

It will be appreciated that the communications and/or actions depicted in FIG. 3 are for illustrative purposes and that different and/or additional communications and/or actions than those depicted in FIG. 3 may be used for testing VNFs and/or other aspects of NFV. It will also be appreciated that various communications and/or actions described herein may occur concurrently or in a different order or sequence.

Figure 4:
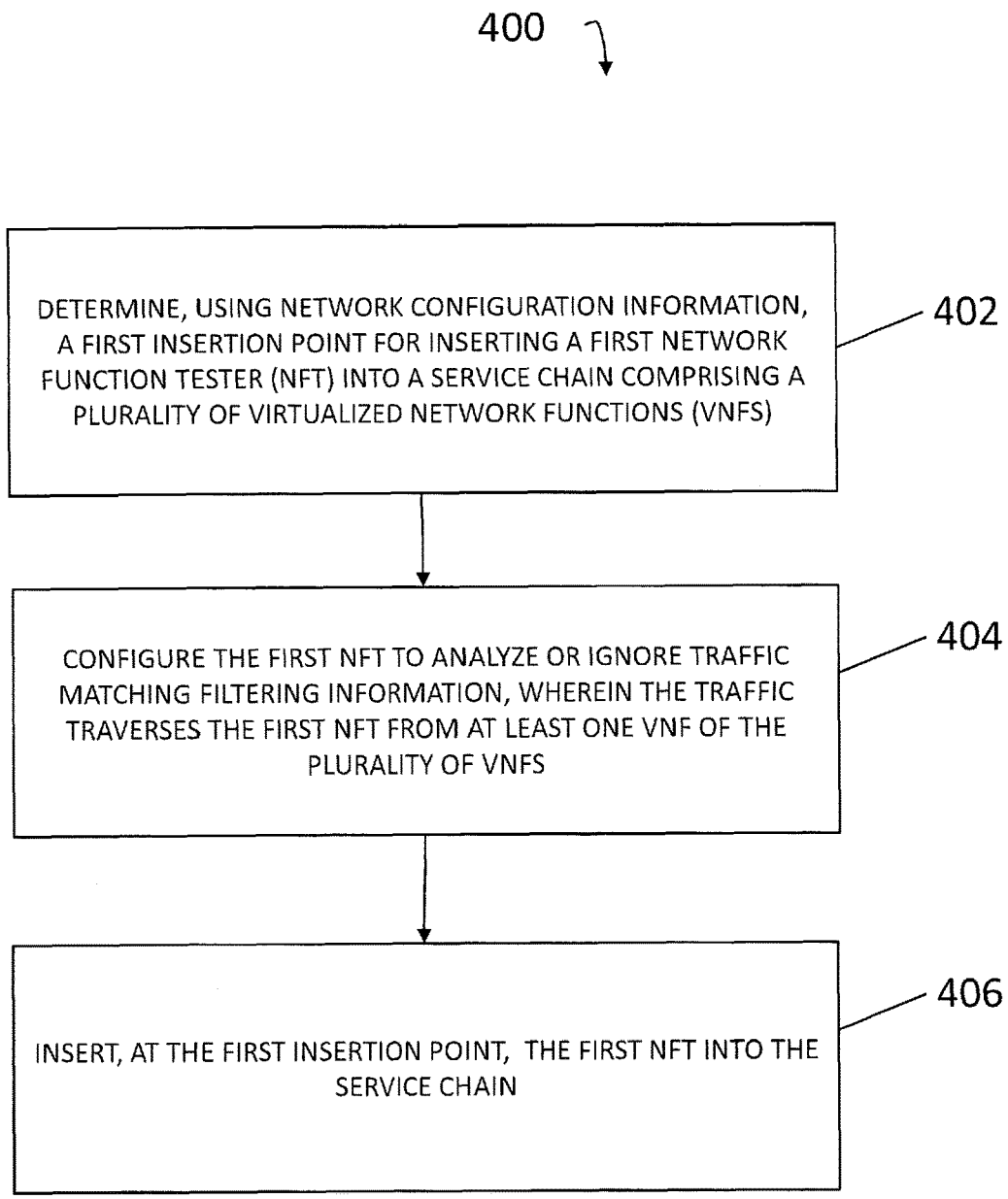
FIG. 4 is a diagram illustrating a process for testing NFV according to an embodiment of the subject matter described herein.
15

FIG. 4 is a diagram illustrating a process 400 for testing NFV according to an embodiment of the subject matter described herein. In some embodiments, process 400, or portions thereof, may be performed by or at tester controller 104, network controller 106, and/or another node or module (e.g., a network test controller). In some embodiments, process 400 may include steps 402 and/or 404.

Referring to process 400, in step 402, a first insertion point for inserting a first NFT into a service chain may be determined using network configuration information. The service chain may comprise a plurality of VNFs. For example, after detecting traffic issues, a tester controller 104 may determine an insertion point for inserting NFT 116 after VNF 110 but prior to VNF 112.

In step 404, the first NFT may be configured to analyze or ignore traffic matching filtering information, wherein the traffic traverses the first NFT from at least one VNF of the plurality of VNFs. For example, network controller 106 may receive a request for inserting NFT 120 into service chain 108. In this example, the request may include filtering information indicating which traffic is to be tested and/or analyzed.

In step 404, the first NFT may be inserted, at the first insertion point, into the service chain. For example, network controller 106 may insert NFT 120 after VNF 114 in service chain 108.

In some embodiments, determining a first insertion point may be based on detected traffic issues. For example, a network test controller (e.g., a device or platform with functionality of tester controller 104 and/or network controller 106) may analyze network traffic traversing service chain 106 or related analytics. In this example, the network test controller may determine that a first VNF is improperly formatting some packets. Continuing with this example, the network test controller may determine an insertion point such that a first NFT is inserted into service chain 108 prior to the first VNF.

In some embodiments, a second NFT may be inserted at a second insertion point into a service chain, where at least one VNF is located between a first NFT and the second NFT in the service chain. For example, VNF 112 may be located between NFT 116 and NFT 118 in service chain 108.

In some embodiments, a second NFT may generate and send traffic to at least one VNF for testing the at least one VNF. For example, in service chain 108, NFT 118 may generate packets for testing VNF 114. In this example, NFT 118 may send or forward these packets to VNF 114.

In some embodiments, a second NFT may send received traffic to at least one VNF for testing the at least one VNF. For example, in service chain 108, NFT 118 may receive traffic from VNF 112 via an ingress port. In this example, NFT 118 may send or forward this traffic to VNF 114 via an egress port.

In some embodiments, a first NFT and a second NFT may communicate information about traffic amongst each other. For example, in service chain 108, NFT 118 may receive traffic from VNF 112. In this example, NFT 118 may analyze the traffic and send analysis information about the traffic to NFT 120. In this example, NFT 120 may receive traffic from VNF 114. In this example, NFT 120 may analyze the traffic and send analysis information about the traffic to NFT 118.

In some embodiments, a first NFT and at least one VNF may be implemented using at least one computer platform. For example, in service chain 108, VNF 110 and NFT 118 may be implemented using hardware from one or more server racks and/or computer systems. In this example, VNF 112 and NFT 120 may be implemented using the same hardware or different hardware.

In some embodiments, a first NFT may be configured or inserted based on network topology information. For example, network controller 106 may send network topology information periodically to tester controller 104. In this example, tester controller 104 may use this network topology information to request that a NFT be inserted into service chain 108.

In some embodiments, a first NFT may test a load balancing function, an intrusion detection function, an intrusion protection function, an antivirus function, a firewall function, an antispam function, a switching function, or a routing function. For example, service chain 108 may include VNF 112 and NFT 116. In this example, VNF 110 may receive packets generated and sent NFT 116 and analyze the packets for potential computer viruses.

It will be appreciated that process 400 is for illustrative purposes and that different and/or additional actions may be used. It will also be appreciated that various actions described herein may occur in a different order or sequence.

It should be noted that network controller 106, tester controller 104, computing environment 100, and/or functionality described herein may constitute a special purpose computing device. Further, network controller 106, tester controller 104, computing environment 100, and/or functionality described herein can improve the technological field of testing VNFs and aspects of NFV by providing mechanisms for deploying configurable bypass NFTs into a service chain, where some traffic may be ignored or analyzed depending filtering information and/or configuration information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing network function virtualization, the method comprising:
   at a network test controller implemented using at least one processor:
      determining, using network configuration information, a first insertion point for inserting a first network function tester (NFT) into a service chain comprising a plurality of virtualized network functions (VNFs);
      configuring the first NFT based on traffic matching filtering information, wherein the traffic matching filtering information indicates a first portion of traffic for analysis and a second portion of the traffic for bypassing analysis;
      inserting, using a software defined networking (SDN) related interface and at the first insertion point, the first NFT into the service chain, wherein the first NFT performs analysis on the first portion of the traffic to test at least one of the plurality of VNFs and wherein the second portion of the traffic bypasses analysis, wherein the traffic traverses the first NFT from at least one VNF of the plurality of VNFs; and
      inserting, at a second insertion point, a second NFT into the service chain, wherein the at least one VNF is located between the second NFT and the first NFT in the service chain.

2. The method of claim 1 wherein the second NFT generates and sends traffic to the at least one VNF for testing the at least one VNF.

3. The method of claim 1 wherein the second NFT sends received traffic to the at least one VNF for testing the at least one VNF.

4. The method of claim 1 wherein the first NFT and the second NFT communicate information about the traffic amongst each other.

5. The method of claim 1 wherein the first NFT and the at least one VNF are implemented using at least one computer platform.

6. The method of claim 1 wherein the network configuration information includes network topology information.

7. The method of claim 1 wherein determining the first insertion point is based on detected traffic issues.

8. The method of claim 1 wherein the first NFT tests a load balancing function, an intrusion detection function, an intrusion protection function, an antivirus function, an anti-spam function, a firewall function, a switching function, or a routing function.

9. A system for testing network function virtualization, the system comprising:
   at least one processor; and
   a network test controller implemented using the at least one processor, wherein the network test controller is configured to determine, using network configuration information, a first insertion point for inserting a first network function tester (NFT) into a service chain comprising a plurality of virtualized network functions (VNFs), to configure the first NFT based on traffic matching filtering information, wherein the traffic matching filtering information indicates a first portion of traffic for analysis and a second portion of the traffic for bypassing analysis, and to insert, using a software defined networking (SDN) related interface and at the first insertion point, the first NFT into the service chain, wherein the first NFT performs analysis on the first portion of the traffic to test at least one of the plurality of VNFs wherein the second portion of the traffic bypasses analysis, wherein the traffic traverses the first NFT from at least one VNF of the plurality of VNFs, and wherein the network test controller is configured to insert, at a second insertion point, a second NFT into the service chain, wherein the at least one VNF is located between the first NFT and the second NFT in the service chain.

10. The system of claim 9 wherein the second NFT generates and sends traffic to the at least one VNF for testing the at least one VNF.

11. The system of claim 9 wherein the second NFT sends received traffic to the at least one VNF for testing the at least one VNF.

12. The system of claim 9 wherein the first NFT and the second NFT communicate information about the traffic amongst each other.

13. The system of claim 9 wherein the first NFT and the at least one VNF are implemented using at least one computer platform.

14. The system of claim 9 wherein the network configuration information includes network topology information.

15. The system of claim 9 wherein the network test controller is configured to determine the first insertion point based on detected traffic issues.

16. The system of claim 9 wherein the first NFT tests a load balancing function, an intrusion detection function, an intrusion protection function, an antivirus function, an anti-spam function, a firewall function, a switching function, or a routing function.

17. A non-transitory computer readable medium having stored thereon executable instructions embodied in the computer readable medium that when executed by at least one processor of a network test controller cause the network test controller to perform steps comprising:
   determining, using network configuration information, a first insertion point for inserting a first network function tester (NFT) into a service chain comprising a plurality of virtualized network functions (VNFs);
   configuring the first NFT based on traffic matching filtering information, wherein the traffic matching filtering information indicates a first portion of traffic to analyze and a second portion of the traffic to ignore for analysis purposes;
   inserting, using a software defined networking (SDN) related interface and at the first insertion point, the first NFT into the service chain, wherein the first NFT performs analysis on the first portion of the traffic to test at least one of the plurality of VNFs and wherein the second portion of the traffic bypasses analysis, wherein the traffic traverses the first NFT from at least one VNF of the plurality of VNFs; and
   inserting, at a second insertion point, a second NFT into the service chain, wherein the at least one VNF is located between the second NFT and the first NFT in the service chain.

* * * * *